US009581318B2

(12) United States Patent
Clark

(10) Patent No.: US 9,581,318 B2

(45) Date of Patent: Feb. 28, 2017

(54) TWIST LOCK OPTICAL HOLDER FOR RECESSED LIGHTING

(71) Applicant: ABL IP Holding LLC, Decatur, GA (US)

(72) Inventor: Stephen Howard Clark, Downers Grove, IL (US)

(73) Assignee: ABL IP Holding LLC, Decatur, GA (US)

( * ) Notice: Subject to any disclaimer, the term of this patent is extended or adjusted under 35 U.S.C. 154(b) by 0 days.

(21) Appl. No.: 14/606,365

(22) Filed: Jan. 27, 2015

(65) Prior Publication Data

US 2015/0219325 A1 Aug. 6, 2015

Related U.S. Application Data

(60) Provisional application No. 61/935,000, filed on Feb. 3, 2014.

(51) Int. Cl.

| | |
|---|---|
| ***F21V 15/00*** | (2015.01) |
| ***F21V 17/00*** | (2006.01) |
| ***B60Q 1/06*** | (2006.01) |
| ***F21V 29/00*** | (2015.01) |
| ***F21V 21/00*** | (2006.01) |
| ***F21V 21/04*** | (2006.01) |
| ***F21V 29/70*** | (2015.01) |
| ***F21S 8/02*** | (2006.01) |
| ***F21V 7/04*** | (2006.01) |
| *F21Y 101/00* | (2016.01) |

(52) U.S. Cl.

CPC ............ *F21V 21/047* (2013.01); *F21S 8/026* (2013.01); *F21V 7/041* (2013.01); *F21V 29/70* (2015.01); *F21Y 2101/00* (2013.01)

(58) Field of Classification Search

CPC .... F21Y 2101/02; F21V 21/047; F21V 29/70; F21S 8/026; F21S 8/024; F21S 8/02; F21S 8/022

USPC .......................................................... 362/364

See application file for complete search history.

(56) References Cited

U.S. PATENT DOCUMENTS 4,410,931 A * 10/1983 DeCandia ............. F21V 17/164 362/223

8,414,163 B2 * 4/2013 Hashimoto ............... F21V 3/00 362/368

(Continued)

*Primary Examiner* — Peggy Neils

*Assistant Examiner* — Erin Kryukova

(74) *Attorney, Agent, or Firm* — Kilpatrick Townsend & Stockton, LLP

(57) ABSTRACT

A recessed lighting optical holder for a recessed lighting fixture, comprises a retainer 100 having a generally annular shape, including a resilient snap projection 105 formed on an inner circumference and resilient beam 130 supported at both ends on an outer circumference. The beam slides into engagement with a heat sink extension 122 on a bottom portion of a circular heat sink 110, when a top surface of the retainer is positioned against a bottom portion of the heat sink and the retainer is rotated with respect to the heat sink, to lock the retainer to the heat sink. An optic 120 has a generally conical shape, with a bottom portion surrounded by circular lip 125 that snaps into holding engagement with the snap of the retainer, to positively retain the optic. The holder is relatively simple to manufacture and is conveniently accessible for installation and occasional maintenance or replacement.

9 Claims, 9 Drawing Sheets

(56) References Cited

U.S. PATENT DOCUMENTS

| | | | | |
|---|---|---|---|---|
| 2009/0180287 | A1* | 7/2009 | Tang | F21K 9/00 362/351 |
| 2010/0091499 | A1* | 4/2010 | Jiang | F21V 5/04 362/268 |
| 2010/0259919 | A1* | 10/2010 | Khazi | F21S 8/026 362/84 |
| 2010/0328960 | A1* | 12/2010 | Wang | F21V 29/004 362/373 |
| 2011/0063849 | A1* | 3/2011 | Alexander | F21S 48/328 362/294 |
| 2012/0106138 | A1* | 5/2012 | Mandy | B66B 11/0233 362/147 |
| 2012/0106177 | A1* | 5/2012 | Blankestijn | F21V 17/14 362/382 |
| 2014/0153250 | A1* | 6/2014 | Matsushita | F21K 9/30 362/294 |

* cited by examiner

TWIST LOCK OPTICAL HOLDER FOR RECESSED LIGHTING

This patent application claims benefit under 35 U.S.C. 119(e), of the earlier filing date of U.S. Provisional Patent Application Ser. No. 61/935,000, filed Feb. 3, 2014.

BACKGROUND OF THE INVENTION

1. Field of the Invention

The invention disclosed relates generally to lighting fixtures and in particular to installation of recessed lighting fixtures.

2. Discussion of the Related Art

Recessed lighting fixtures are designed to be minimally visible from below a ceiling in which they are mounted. LED light sources used for recessed lighting typically generate significant quantities of heat, requiring the use of a heat sink as part of the lighting fixture, to avoid overheating. The LED light source, and an associated reflector referred to as the optic, are typically mounted in the heat sink so as to project light from the bottom of the heat sink. In some designs the heat sink may be supported in a mounting frame that is suspended by bar hangers fastened between joists above the ceiling. The mounting frame is positioned so that the bottom of the heat sink passes through an opening in the ceiling and is approximately flush with the bottom surface of the ceiling. A trim ring typically surrounds the opening in the ceiling, to mask the opening.

The mounting of the optic within the heat sink must be relatively simple to manufacture and be conveniently accessible for initial installation and for occasional maintenance and replacement. Existing examples of LED recessed lighting fixtures may require secondary machining for threaded surfaces and may require tooling for side actions in injection molding manufacturing. Existing examples have the optic and its mounting hardware as separate components, making them inconvenient to initially install, maintain and replace.

Accordingly, there is a need for a device for mounting of the optic within the heat sink, which is relatively simple to manufacture and conveniently accessible for initial installation and for occasional maintenance or replacement.

SUMMARY OF THE INVENTION

Example embodiments of the invention provide an improved recessed lighting optical holder that is relatively simple to manufacture and positively retains the optic for convenient accessibility during installation, maintenance, or replacement.

In accordance with an example embodiment of the invention, a recessed lighting optical holder includes a retainer having a generally annular shape, with an outer circumferential surface, an inner circumferential surface, a top surface, and a bottom surface. The retainer includes a resilient snap projection formed on the inner circumferential surface of the retainer and a resilient beam supported at both ends on the outer circumferential surface of the retainer. The resilient beam is generally shaped as a circular segment that is substantially parallel with the top surface of the retainer. The resilient beam is configured to slide into engagement with a heat sink extension on a bottom portion of a circular inner heat sink of a recessed lighting fixture. When the top surface of the retainer is positioned against the bottom portion of the circular inner heat sink and the retainer is rotated with respect to the inner heat sink, the resilient beam is configured to be deflected by the heat sink extension as the retainer is rotated, to lock the retainer to the inner heat sink.

The recessed lighting optical holder also includes an optic having a generally conical shape, with a narrower top portion and a broader bottom portion. The optic has a circular lip surrounding the bottom portion, which is configured to snap into holding engagement with the resilient snap projection formed on the inner circumferential surface of the retainer. The optic snapped into the retainer forms a unitary optic assembly that is easier to manipulate during installation, maintenance, or replacement.

One end of the resilient beam has a tip that loosely fits against the heat sink extension on the bottom portion of the inner heat sink. The resilient beam has a central portion configured to have an interference fit against the heat sink extension, which causes the central portion of the beam to be deflected by the heat sink extension as the retainer is rotated with respect to the inner heat sink, to lock the retainer to the inner heat sink.

A clearance slot is formed adjacent to one end of the resilient beam. The clearance slot allows clearance for passage of a tab on the heat sink extension on the bottom portion of the circular inner heat sink, when the top surface of the retainer is positioned against the bottom portion of the circular inner heat sink The retainer includes a bracket formed on the bottom surface of the retainer, the bracket being configured to support an optic film used to color, diffuse, or direct light produced by the recessed lighting fixture.

DETAILED DESCRIPTION OF EMBODIMENTS OF THE INVENTION

Figure 1A:
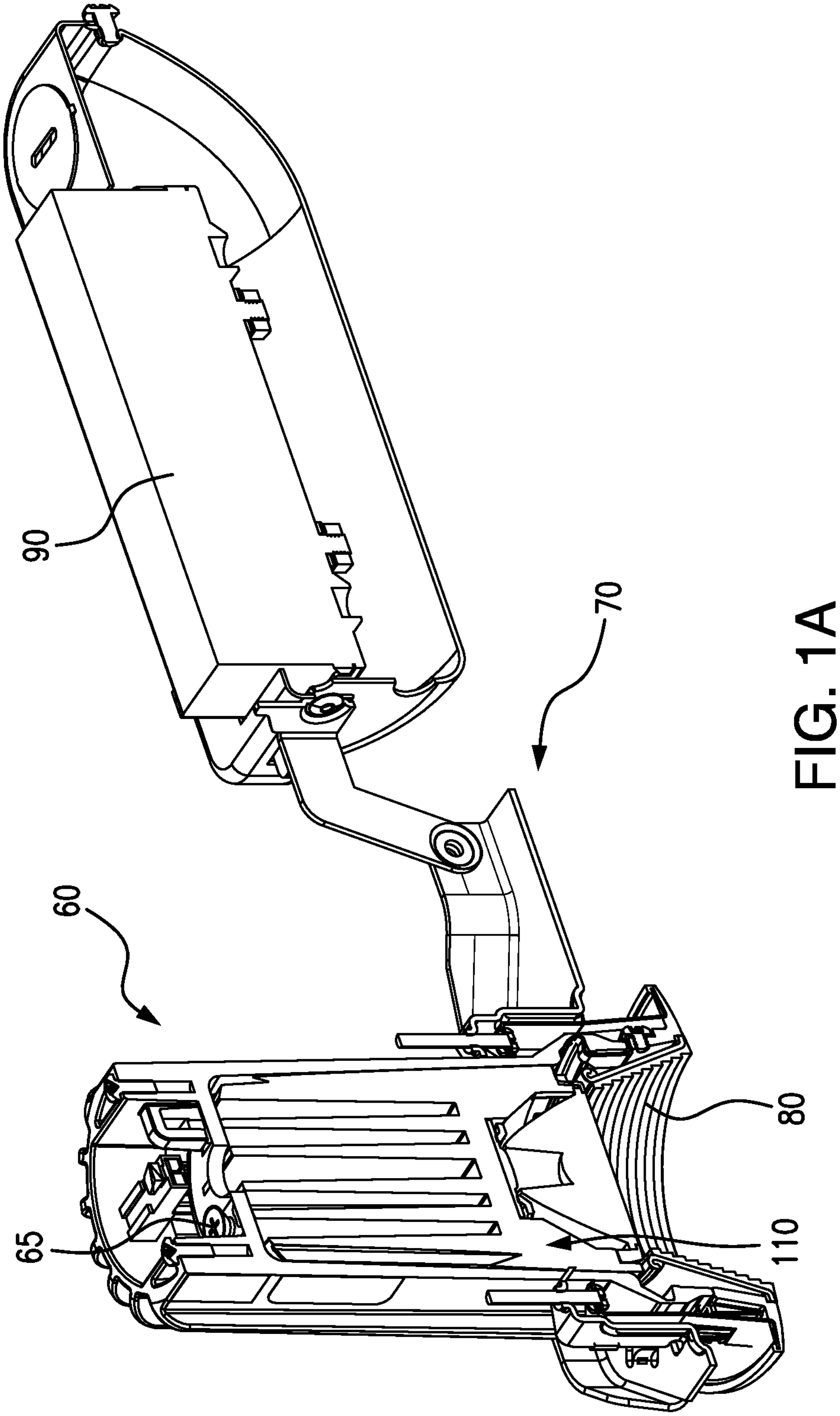
FIG. 1A is a perspective view of a recessed light fixture mounted to a lighting mount assembly. The lighting mount assembly is shown connected to an electrical junction box. The figure shows an inner heat sink inserted into the recessed light fixture, which houses a light source, such as an LED and suitable optics, to direct a light beam out of the recessed light fixture.

FIG. 1A is a perspective view of a recessed light fixture 60 mounted to a lighting mount assembly 70. The lighting mount assembly 70 is shown pivotally connected to an electrical junction box 90. The lighting mount assembly 70 and electrical junction box 90 may be configured to be passed through an opening in a wall or ceiling of a room, into an interior space behind the wall or ceiling. The lighting mount assembly 70 may then be fastened behind the wall or ceiling, over the opening.

After the lighting mount assembly 70 has been secured behind the wall, for example, the recessed light fixture 60 may be mounted onto the lighting mount assembly 70 through the wall opening. The recessed light fixture 60 is an example of a canister-type recessed light fixture, which can be mounted using the light mounting assembly 70.

The figure shows the inner heat sink 110, which may be inserted into the recessed light fixture 60 and secured inside the recessed light fixture 60, by means of a fastener, for example the screw 65. The inner heat sink 110 may house a light source, such as an LED and suitable optics to direct a light beam out of the recessed light fixture 60. A baffle 80 fastened to the bottom of the recessed light fixture 60, as shown in the figure, may be used to help direct the light beam into the room in a preferred direction.

Figure 1B:
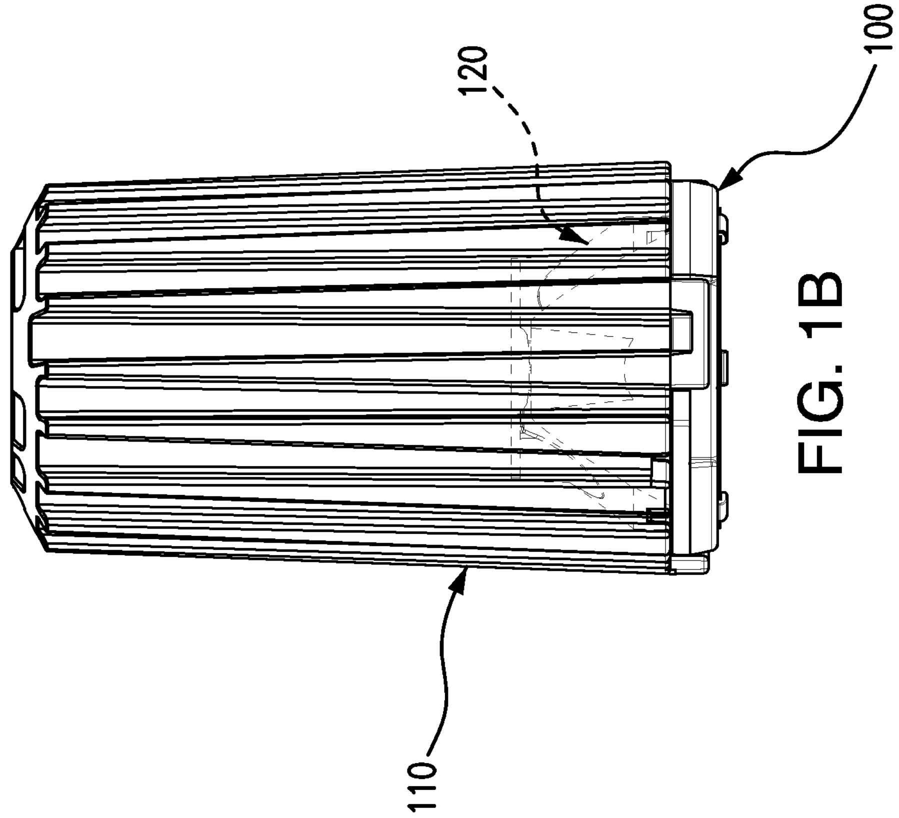
FIG. 1B is a side view of the inner heat sink of FIG. 1A. The figure shows a retainer portion of an optical holder, which has been joined to the bottom of the heat sink and twisted to lock it into position on the heat sink. A conically shaped optic snaps into the retainer, the optic being shown with dotted lines, since it is concealed within the heat sink.

FIG. 1B is a side view of the inner heat sink 110 of FIG. 1A. The figure shows a retainer portion 100 of an optical holder, which has been joined to the bottom of the heat sink 110 and twisted to lock it into position on the heat sink. A conically shaped optic 120 snaps into the retainer 100, the optic being shown with dotted lines, since it is concealed within the heat sink 110.

Figure 2:
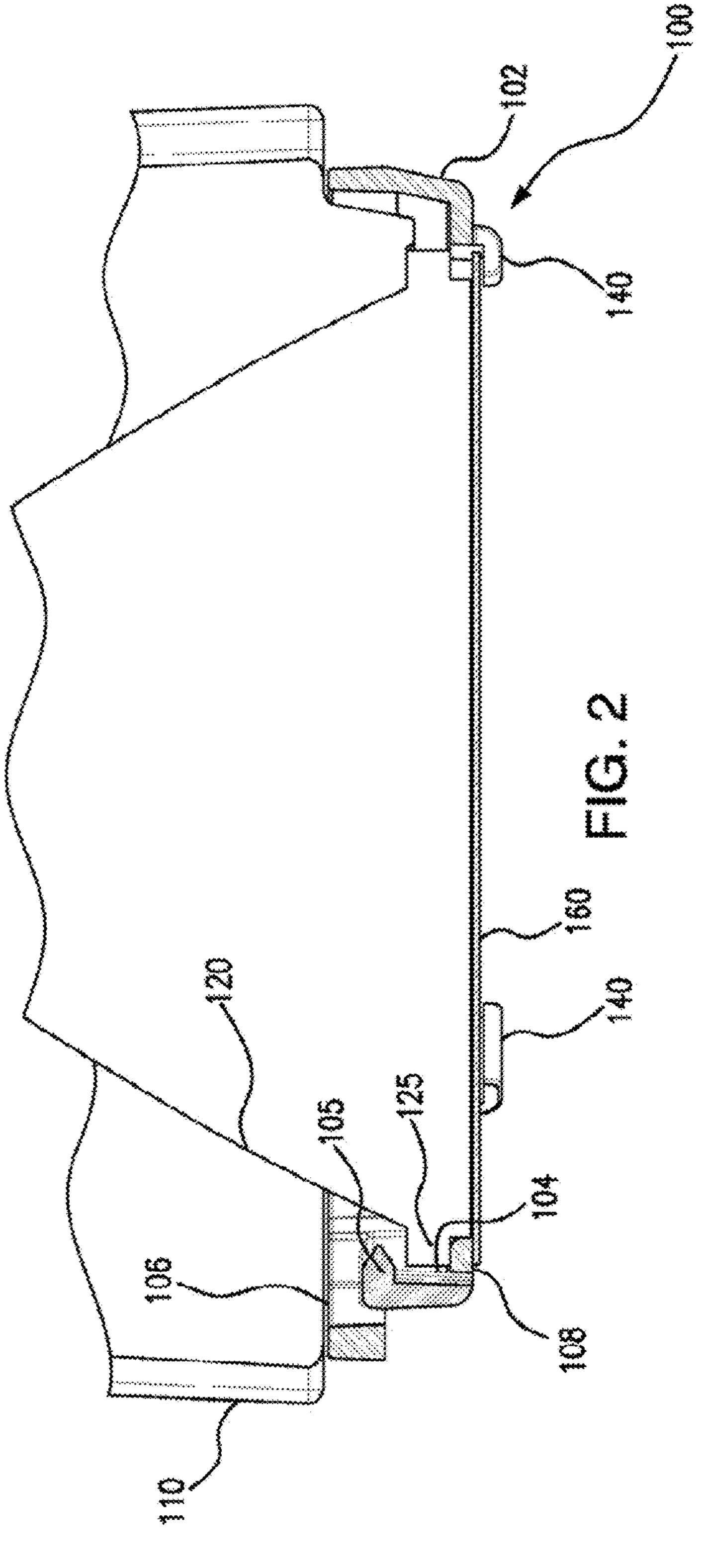
FIG. 2 is a side view, in partial cross section, showing the optic snapped into the retainer and the retainer and optic assembly, joined to the bottom of the heat sink and twisted to lock the assembly into position on the heat sink. The figure shows a resilient snap projection formed on an inner circumferential surface of the retainer, which snaps over a circular lip surrounding the bottom of the conical optic, to hold the optic in place when the retainer is joined to the heat sink. The figure also shows a film or lens that may be positioned in the retainer on a bracket formed on the bottom surface of the retainer.

FIG. 2, is a side view in partial cross section, showing the optic 120 snapped into the retainer 100 and the retainer and optic assembly, joined to the bottom of the heat sink 110 and twisted to lock the assembly into position on the heat sink. The figure shows a resilient snap projection 105 formed on an inner circumferential surface 104 of the retainer, which snaps over a circular lip 125 surrounding the bottom of the conical optic 120, to hold the optic in place when the retainer 100 is joined to the heat sink. The figure also shows a film or lens 160 that may be positioned in the retainer 100 on a bracket 140 formed on the bottom surface 108 of the retainer 100.

For purposes of illustration, the sequence of FIG. 3 to FIG. 7 shows an example of consecutive stages in assembling the film 160 and the optic 120 to the retainer 100 and then joining the retainer assembly to the bottom of the heat sink 110 and twisting the retainer 100 to lock it into position on the heat sink 110. However, there is no particular sequence that is required for assembly, and either the film 160 or optic 120 may be inserted first.

Figure 3:
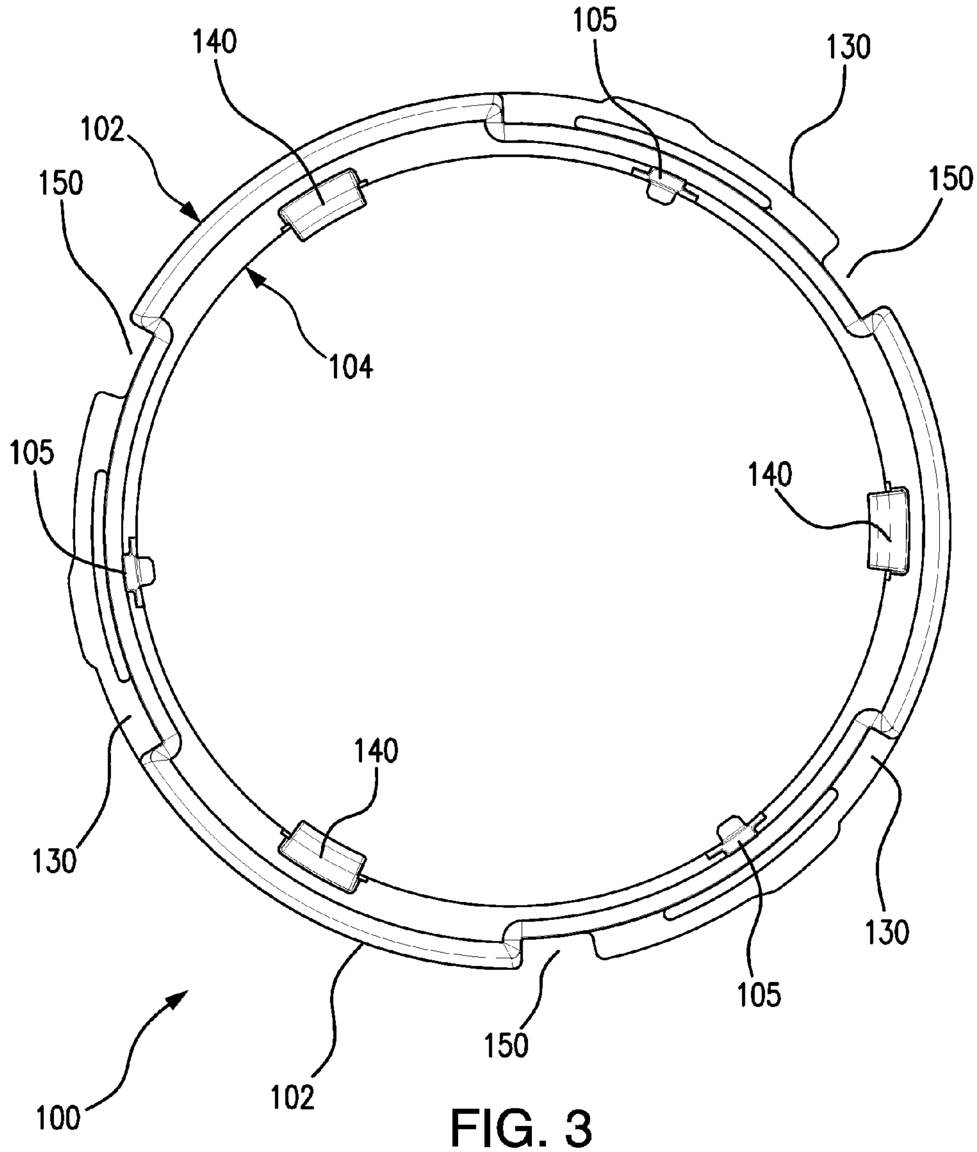
FIG. 3 is a bottom view of the retainer. The figure shows a resilient beam supported at both ends on an outer circumferential surface of the retainer. The figure shows three resilient snap projections formed on the inner circumferential surface of the retainer. The figure shows three brackets formed on the bottom surface of the retainer, for supporting the film. The figure shows three resilient beams, each supported at both ends on the outer circumferential surface of the retainer, which are configured to lock the retainer into position on the heat sink. For purposes of illustration, the sequence of FIG. 3 to FIG. 7 shows an example of consecutive stages in assembling the film and the optic to the retainer and then joining the retainer assembly to the bottom of the heat sink and twisting the retainer to lock it into position on the heat sink. However, there is no particular sequence that is required for assembly, and either the film or optic may be inserted first.

FIG. 3 is a bottom view of the retainer 100. The figure shows a resilient beam 130 supported at both ends on an outer circumferential surface 102 of the retainer 100. The figure shows three resilient snap projections 105 formed on the inner circumferential surface 104 of the retainer 100. The figure shows three brackets 140 formed on the bottom surface 108 of the retainer 100, for supporting the film 160. The figure shows three resilient beams 130, each supported at both ends on the outer circumferential surface 102 of the retainer 100, which are configured to lock the retainer 100 into position on the heat sink 110.

Figure 4:
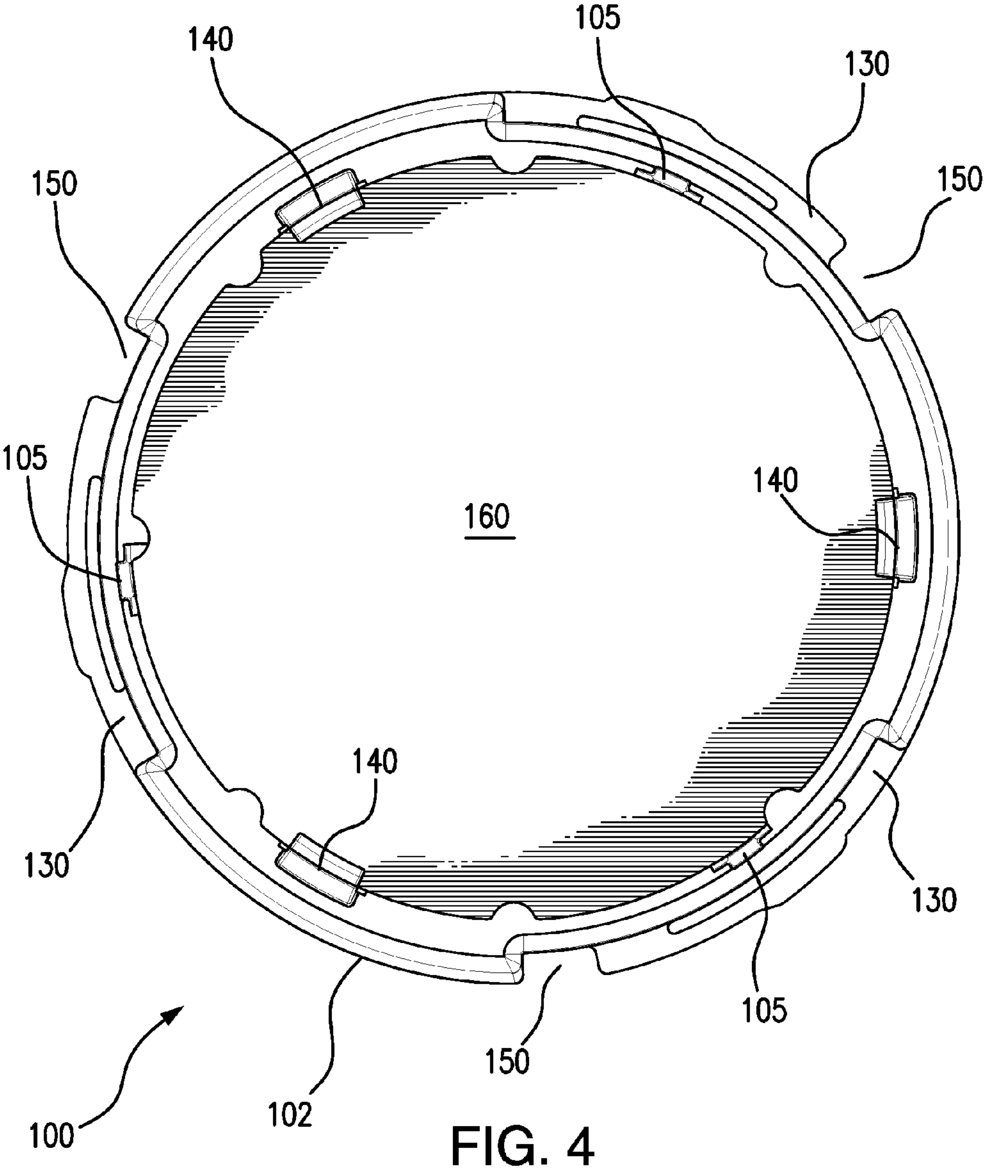
FIG. 4 is the bottom view of the retainer shown in FIG. 3, with the film positioned in the retainer, the film being supported by the three supporting brackets.

FIG. 4 is the bottom view of the retainer 100 shown in FIG. 3, with the film 160 positioned in the retainer 100, the film being supported by the three supporting brackets 140.

Figure 5:
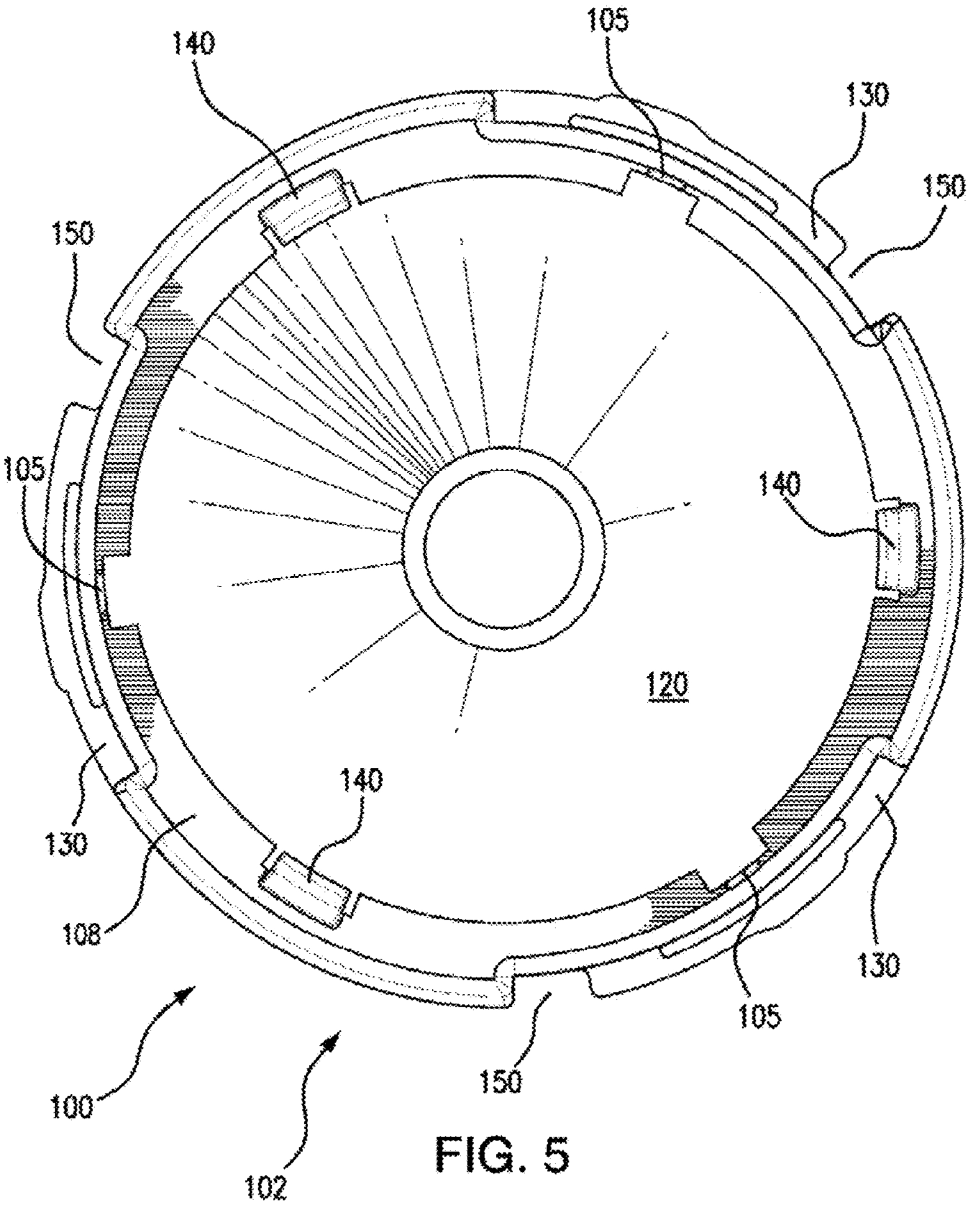
FIG. 5 is the bottom view of the retainer shown in FIG. 4, with the film removed to show the optic snapped into the retainer with the three resilient snap projections.

FIG. 5 is the bottom view of the retainer 100 shown in FIG. 4, with the film 160 removed to show the optic 120 snapped into the retainer 100 with the three resilient snap projections 105.

Figure 6:
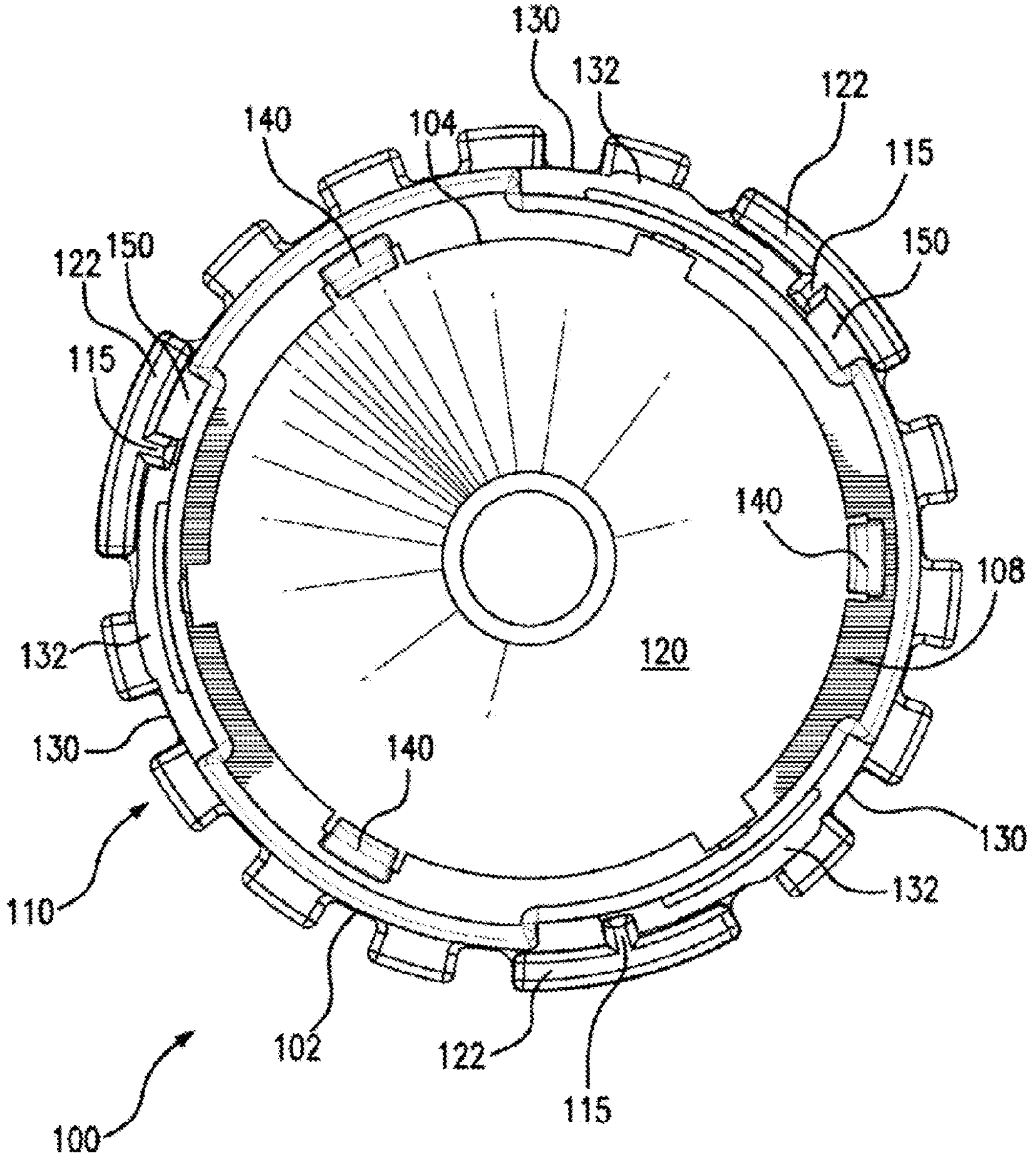
FIG. 6 is the bottom view of the retainer shown in FIG. 5, with the retainer assembly joined to the bottom of the heat sink. The figure shows a clearance slot adjacent to one end of the resilient beam. The clearance slot allows clearance for passage of a tab on a heat sink extension on the bottom portion of the heat sink, when the top surface of the retainer is positioned against the bottom portion of the heat sink.

FIG. 6 is the bottom view of the retainer 100 shown in FIG. 5, with the retainer assembly of the optic 120, film 160 (removed in this view), and retainer 100, joined to the bottom of the heat sink 110. The figure shows a clearance slot 150 adjacent to one end of the resilient beam 130. The clearance slot 150 allows clearance for passage of a tab 115 on a heat sink extension 122 on the bottom portion of the heat sink 110, when the top surface 106 of the retainer 100 is positioned against the bottom portion of the heat sink 110. As the retainer 100 rotates clockwise, the resilient beam 130 passes above tab 115, thus holding the resilient beam 130 and the retainer 100 vertically in place with the heat sink 110, as shown in FIG. 8. The resilient beam 130 has a thicker central portion 132 configured to have an interference fit against the heat sink extension 122, when the retainer 100 is rotated with respect to the heat sink 110, as shown in FIG. 7.

Figure 7:
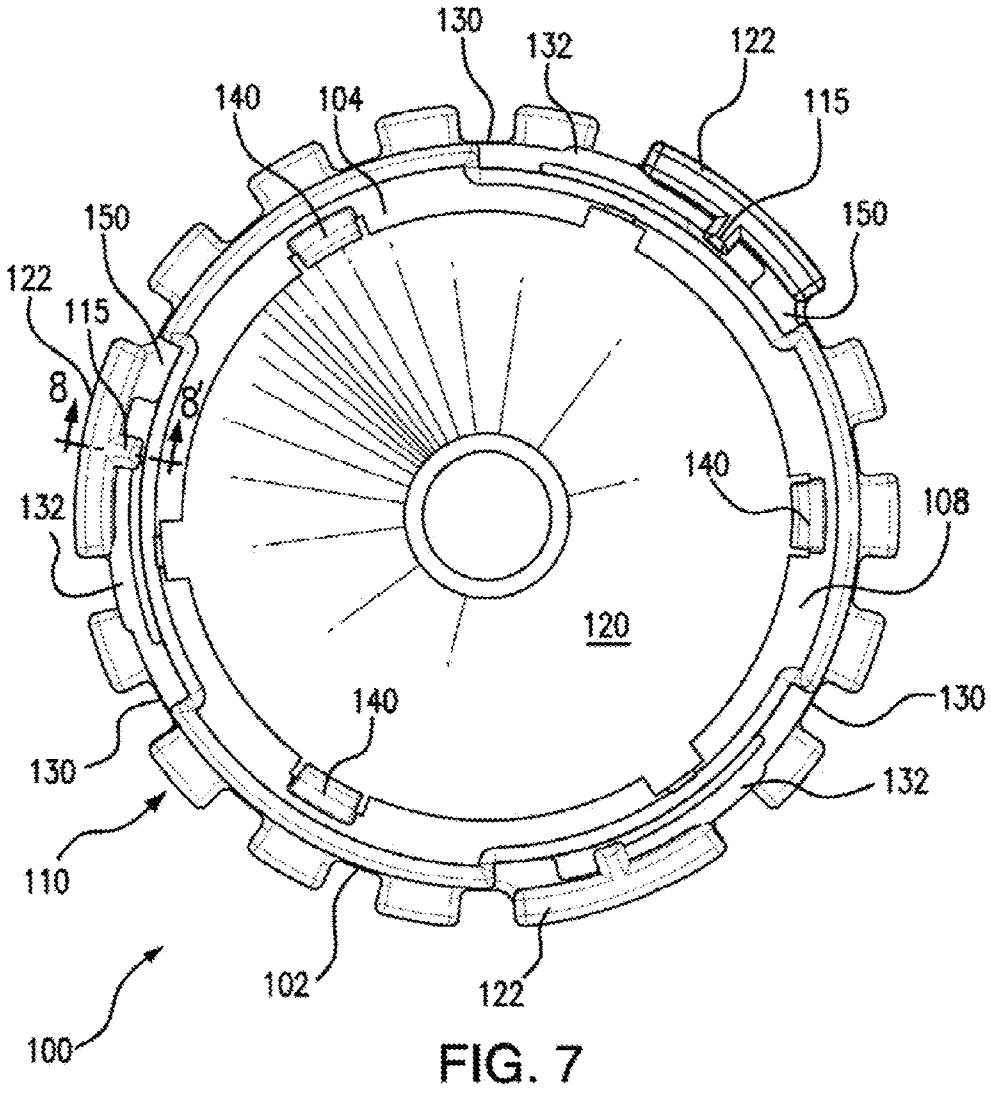
FIG. 7 is the bottom view of the retainer and heat sink shown in FIG. 6, twisted to lock the retainer assembly into position on the heat sink. The figure shows one end of each resilient beam has a tip that loosely fits against the heat sink extension on the bottom portion of the heat sink. The resilient beam has a central portion configured to have an interference fit against the heat sink extension, which causes the central portion of the beam to be deflected by the heat sink extension as the retainer is rotated with respect to the heat sink, to lock the retainer to the heat sink.
Figure 8:
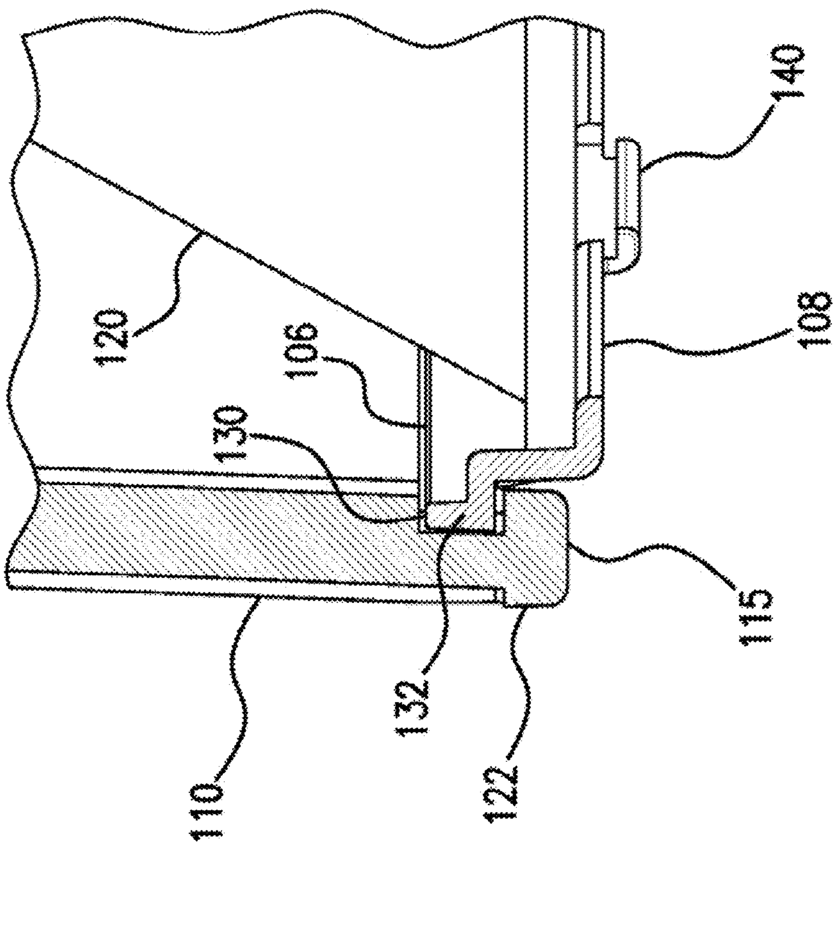
FIG. 8 is a side cross sectional view along the section line 8-8' of FIG. 7, showing the central portion of the resilient beam configured to have an interference fit against the heat sink extension, which causes the central portion of the beam to be deflected by the heat sink extension as the retainer is rotated with respect to the heat sink, to lock the retainer to the heat sink.

FIG. 7 is the bottom view of the retainer 100 and heat sink 110 shown in FIG. 6, twisted to lock the retainer assembly into position on the heat sink 110. The figure shows one end of each resilient beam 130 has a tip that loosely fits above the tab 115 and against the heat sink extension 122 (shown in FIG. 8) on the bottom portion of the heat sink 110. The resilient beam 130 has the thicker central portion 132 configured to have an interference fit against the heat sink extension 122, which causes the central portion 132 of the beam 130 to be deflected by the heat sink extension 122 as the retainer 100 is rotated with respect to the heat sink 110, to lock the retainer to the heat sink.

FIG. 8 is a side cross sectional view along the section line 8-8' of FIG. 7, showing the thicker central portion 132 of the resilient beam 130 configured to have an interference fit against the heat sink extension 122, which causes the central portion 132 of the beam 130 to be deflected by the heat sink extension 122 as the retainer 100 is rotated with respect to the heat sink 110, to lock the retainer to the heat sink.

The invention claimed is:

1. A recessed lighting optical holder, comprising:

(a) a retainer having
  a generally annular shape that includes an outer circumferential surface that is generally cylindrical except at locations of one or more clearance slots,
  an inner circumferential surface,
  a top surface, and
  a bottom surface,
the retainer including
  a resilient snap projection on the inner circumferential surface of the retainer and
  one or more resilient beams, each of the resilient beams being located at least partially within a corresponding one of the one or more clearance slots in the outer circumferential surface of the retainer,
    each of the one or more resilient beams being generally shaped as a circular segment,
    each resilient beam of the one or more resilient beams being attached to the retainer at a first radial end and a second radial end of the resilient beam, such that a radial gap forms between the retainer and the resilient beam, between the first radial end and the second radial end of the resilient beam,
    each of the one or more resilient beams being configured to slide into engagement with a heat sink extension on a bottom portion of a circular heat sink, when the top surface of the retainer is positioned against the bottom portion of the circular heat sink and the retainer is rotated with respect to the heat sink,
    each of the one or more resilient beams being configured to be deflected by the heat sink extension as the retainer is rotated, to lock the retainer to the heat sink; and
(b) an optic having a generally conical shape, with a narrower top portion and a broader bottom portion, having a circular lip surrounding the bottom portion,
  the circular lip being configured to snap into holding engagement with the resilient snap projection formed on the inner circumferential surface of the retainer.

2. The recessed lighting optical holder of claim 1, wherein one end of each of the one or more resilient beams has a tip that loosely fits against the heat sink extension on the bottom portion of the heat sink,
each of the one or more resilient beams has a thicker central portion disposed radially outward from the radial gap,
such that the thicker central portion is deflected into the radial gap, forming a radial interference fit of the thicker central portion against the heat sink extension as the retainer is rotated with respect to the heat sink.

3. The recessed lighting optical holder of claim 1, wherein each of the one or more clearance slots allows clearance for passage of a tab on the heat sink extension on a bottom portion of the circular heat sink, when the top surface of the retainer is positioned against the bottom portion of the circular heat sink.

4. The recessed lighting optical holder of claim 3, wherein as the retainer is rotated with respect to the heat sink, the resilient beam passes above the tab on the heat sink extension, the tab being configured to hold the resilient beam and the retainer vertically in place with the heat sink.

5. The recessed lighting optical holder of claim 3, further comprising the circular heat sink, wherein:
  the circular heat sink comprises the bottom portion, the heat sink extension and the tab on the heat sink extension; and
  the tab extends radially inward from a lowest point of the heat sink extension.

6. The recessed lighting optical holder of claim 5, wherein the heat sink is configured to be inserted into a recessed light fixture and secured inside the recessed light fixture with a fastener.

7. The recessed lighting optical holder of claim 5, wherein the heat sink forms a cavity for installation of the optic.

8. The recessed lighting optical holder of claim 1, wherein the retainer includes a bracket formed on the bottom surface of the retainer, the bracket being configured to support an optic film.

9. A retainer for retaining an optic to a circular heat sink of a recessed lighting optical holder, comprising:
  a retainer body having a generally annular shape that includes:
    (a) an upper section that forms an outer circumferential surface, the outer circumferential surface being generally cylindrical except at locations of one or more clearance slots, wherein the upper section of the retainer comprises one or more resilient beams, each of the one or more resilient beams:
      being at least partially within a corresponding one of the one or more clearance slots;
      being generally shaped as a circular segment;
      being attached to the outer circumferential surface of the retainer at a first radial end and a second radial end of the resilient beam, such that a radial gap forms between the retainer body and the resilient beam, between the first radial end and the second radial end of the resilient beam; and
      being configured to slide into engagement with corresponding portions of the circular heat sink when the top surface of the retainer is positioned against the circular heat sink and the retainer is rotated with respect to the heat sink, such that each of the one or more resilient beams is deflected toward the radial gap by the circular heat sink as the retainer is rotated, the deflection forming a radial interference fit that secures the retainer to the heat sink; and
  (b) a lower section that forms a bottom surface and an inner circumferential surface;
  wherein the lower section forms a plurality of resilient snap projections for retaining the optic to the retainer body.

* * * * *